US012790490B2

(12) United States Patent
Fini et al.

(10) Patent No.: US 12,790,490 B2
(45) Date of Patent: Nov. 10, 2026

(54) CARBON NEGATIVE WOOD-PLASTIC COMPOSITES FROM CARBON DIOXIDE

(71) Applicants: Elham Fini, Phoenix, AZ (US); Farideh Pahlavan, Tempe, AZ (US); Albert Hung, Tempe, AZ (US)

(72) Inventors: Elham Fini, Phoenix, AZ (US); Farideh Pahlavan, Tempe, AZ (US); Albert Hung, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 760 days.

(21) Appl. No.: 18/187,216

(22) Filed: Mar. 21, 2023

(65) Prior Publication Data

US 2023/0323128 A1 Oct. 12, 2023

Related U.S. Application Data

(60) Provisional application No. 63/322,117, filed on Mar. 21, 2022.

(51) Int. Cl.

| | |
|---|---|
| ***C08L 97/02*** | (2006.01) |
| ***B29C 64/314*** | (2017.01) |
| ***B29K 67/00*** | (2006.01) |
| ***B29K 105/16*** | (2006.01) |
| ***B29K 105/26*** | (2006.01) |
| ***B33Y 70/10*** | (2020.01) |
| ***C08K 3/04*** | (2006.01) |

(52) U.S. Cl.

CPC ............ *C08L 97/02* (2013.01); *B29C 64/314* (2017.08); *B33Y 70/10* (2020.01); *C08K 3/04* (2013.01); *B29K 2067/003* (2013.01); *B29K 2093/00* (2013.01); *B29K 2105/16* (2013.01); *B29K 2105/26* (2013.01)

(58) Field of Classification Search

None

See application file for complete search history.

(56) References Cited

U.S. PATENT DOCUMENTS

| | | | | |
|---|---|---|---|---|
| 12,577,112 | B2 * | 3/2026 | Fini | C01B 32/324 |
| 2019/0106637 | A1 | 4/2019 | Oswald | |
| 2019/0315662 | A1 * | 10/2019 | Shearer | B01J 20/20 |
| 2023/0159390 | A1 * | 5/2023 | Fini | C01B 32/192 106/277 |

FOREIGN PATENT DOCUMENTS

| | | | |
|---|---|---|---|
| AU | 2015213412 | A1 | 9/2015 |
| CN | 109553893 | * | 1/2018 |
| CN | 108219251 | * | 4/2019 |
| CN | 113145069 | A | 7/2021 |
| DE | 102015013981 | A1 | 3/2017 |
| WO | 2009016381 | A2 | 2/2009 |
| WO | 2015121613 | A1 | 8/2015 |
| WO | 2021097068 | A1 | 5/2021 |

OTHER PUBLICATIONS

Chatterjee et all Ultrasound cavitation intensified amine functionalization: a feasible strategy for enhancing CO2 caputre capacity of biochar, Fuel 225 (2018) 287-298 (Year: 2018).*

Idrees and all., Three-Dimensional-Printed Sustainable Biochar-Recycled PET Composites, ACS Sustainable Chem. Eng. 2018, 6, 13940-13948 (Year: 2018).*

Y. Choi, D. Jeon, Y. Choi, J. Ryu, and B. S. Kim, "Self-Assembled Supramolecular Hybrid of Carbon Nanodots and Polyoxometalates for Visible-Light-Driven Water Oxidation," ACS Appl. Mater. Interfaces, vol. 10, No. 16, pp. 13434-13441, Apr. 2018, doi: 10.1021/ACSAMI.8B00162/SUPPL_FILE/AM8B00162_SI_001.PDF.

D. Łukawski, P. Hochmańska-Kaniewska, D. Janiszewska, G. Wróblewski, J. Patmore, and A. Lekawa-Raus, "Enriching WPCs and NFPCs with Carbon Nanotubes and Graphene," Polymers (Basel)., vol. 14, No. 4, Feb. 2022, doi: 10.3390/POLYM14040745.

Høgsaa, B.; Pedersen, T. H.; Mousavi, M.; Hung, A. M.; Jensen, E. A.; Yu, D.; Christiansen, J. d. C.; Sanporean, C.-G.; Fini, E. H., Multiscale Characterization of a Wood-Based Biocrude as a Green Compatibilizing Agent for High-Impact Polystyrene/Halloysite Nanotube Nanocomposites. ACS Omega 2019, 4, 19934-19943, DOI: 10.1021/acsomega.9b02871.

Høgsaa, Bjarke, et al. "A novel bioresidue to compatibilize sodium montmorillonite and linear low density polyethylene." Industrial & Engineering Chemistry Research 57.4 (2018): 1213-1224.

E. Yildirir, N. Miskolczi, J. A. Onwudili, K. E. Németh, p. T. Williams, and J. Sója, "Evaluating the mechanical properties of reinforced LDPE composites made with carbon fibres recovered via solvothermal processing," Compos. Part B Eng., vol. 78, pp. 393-400, Sep. 2015, doi: 10.1016/J.COMPOSITESB.2015.04.003.

Mousavi, M., Martis, V., & Fini, E. H. (2021). Inherently functionalized carbon from algae to adsorb precursors of secondary organic aerosols in noncombustion sources. ACS Sustainable Chemistry & Engineering, 9(43), 14375-14384.

Dandamudi, K. P. R.; Murdock, T.; Lammers, P. J.; Deng, S.; Fini, E. H. Production of Functionalized Carbon from Synergistic Hydrothermal Liquefaction of Microalgae and Swine Manure. Resour. Conserv. Recycl. 2021, 170, 105564.

Rajib, A., & Fini, E. H. (2020). Inherently functionalized carbon from lipid and protein-rich biomass to reduce ultraviolet-induced damages in bituminous materials. ACS omega, 5(39), 25273-25280.

Rajib, A.; Saadeh, S.; Katawal, P.; Mobasher, B.; Fini, E. H. Enhancing Biomass Value Chain by Utilizing Biochar as A Free Radical Scavenger to Delay Ultraviolet Aging of Bituminous Composites Used in Outdoor Construction. Resour. Conserv. Recycl. 2021, 168:105302, 9 pages.

(Continued)

*Primary Examiner* — Katarzyna I Kolb

(74) *Attorney, Agent, or Firm* — Fish & Richardson P.C.

(57) ABSTRACT

Fabricating a wood-plastic composite includes capturing carbon dioxide from air, providing the carbon dioxide to algae, harvesting the algae, liquefying the algae to yield biochar, treating the biochar to yield functionalized carbon, and combining the functionalized carbon, wood flour, and a plastic feedstock to yield the wood-plastic composite. A wood-plastic composite includes mixed waste plastic, wood flour, and functionalized carbon.

8 Claims, 7 Drawing Sheets

(56) References Cited

OTHER PUBLICATIONS

E. dal Lago, E. Cagnin, C. Boaretti, M. Roso, A. Lorenzetti, and M. Modesti, "Influence of Different Carbon-Based Fillers on Electrical and Mechanical Properties of a PC/ABS Blend," Polym. 2020, vol. 12, p. 29, vol. 12, No. 1, p. 29, Dec. 2019, doi: 10.3390/POLYM12010029.

P. Ranjan, S. Agrawal, A. Sinha, T. R. Rao, J. Balakrishnan, and A. D. Thakur, "A Low-Cost Non-explosive Synthesis of Graphene Oxide for Scalable Applications," Sci. Rep., vol. 8, No. 1, p. 12007, 2018, doi: 10.1038/s41598-018-30613-4.

D. C. Marcano et al., "Improved Synthesis of Graphene Oxide," ACS Nano, vol. 4, No. 8, pp. 4806-4814, Jul. 2010, doi: 10.1021/nn1006368.

J. Bustillos, D. Montero, P. Nautiyal, A. Loganathan, B. Boesl, and A. Agarwal, "Integration of graphene in poly(lactic) acid by 3D printing to develop creep and wear-resistant hierarchical nanocomposites," Polym. Compos., vol. 39, No. 11, pp. 3877-3888, Nov. 2018, doi: 10.1002/PC.24422.

D. W. van Krevelen, "Some basic aspects of flame resistance of polymeric materials," Polymer (Guildf)., vol. 16, No. 8, pp. 615-620, Aug. 1975, doi: 10.1016/0032-3861(75)90157-3.

D. Archer and V. Brovkin, "The millennial atmospheric lifetime of anthropogenic CO2," Clim. Chang. 2008 903, vol. 90, No. 3, pp. 283-297, Jun. 2008, doi: 10.1007/S10584-008-9413-1.

Geophys. Res. Ocean., vol. 110, No. C9, pp. 1-6, Sep. 2005, doi: 10.1029/2004JC002625.

A. Kendall, "Time-adjusted global warming potentials for LCA and carbon footprints," Int. J. Life Cycle Assess. 2012 178, vol. 17, No. 8, pp. 1042-1049, May 2012, doi: 10.1007/S11367-012-0436-5.

D. Oldham, A. Rajib, K. P. R. Dandamudi, Y. Liu, S. Deng, and E. H. Fini, "Transesterification of Waste Cooking Oil to Produce A Sustainable Rejuvenator for Aged Asphalt," Resour. Conserv. Recycl., vol. 168, p. 105297, May 2021, doi: 10.1016/J.RESCONREC.2020.105297.

Samieadel, Alireza, et al. "Improving recycled asphalt using sustainable hybrid rejuvenators with enhanced intercalation into oxidized asphaltenes nanoaggregates." Construction and Building Materials 262 (2020): 120090.

M. Zadshir et al., "Application of a Biomodifier as Fog Sealants to Delay Ultraviolet Aging of Bituminous Materials," J. Mater. Civ. Eng., vol. 30, No. 12, p. 04018310, Sep. 2018, doi: 10.1061/(ASCE)MT.1943-5533.0002483.

Rajib, Amirul, et al. "Weathering Mechanisms in Bitumen" Modified with Polyphosphoric Acid. Journal of Materials in Civil Engineering 33.7 (2021): 04021154.

Hung, A.; Fini, E. H. Surface Morphology and Chemical Mapping of UV-Aged Thin Films of Bitumen. ACS Sustainable Chem. Eng. 2020, 8, 11764-11771.

Toward Carbon-Negative and Emission-Curbing Roads to Drive Environmental Health Hamid Ghasemi, Hessam Yazdani, Amirul Rajib, and Elham H. Fini, ACS Sustainable Chemistry & Engineering 2022 10 (5), 1857-1862 DOI: 10.1021/acssuschemeng.1c07356

IPCC, "Assessment Report 6 Climate Change 2021: The Physical Science Basis," 2021.

M. J. Schwarzkopf and M. D. Burnard, "Wood-Plastic Composites—Performance and Environmental Impacts," in Environmental Impacts of Traditional and Innovative Forest-based Bioproducts, A. Kutnar and S. S. Muthu, Eds. Singapore: Springer Singapore, 2016, pp. 19-43.

Fu, Shao-Yun, et al. "Effects of particle size, particle/matrix interface adhesion and particle loading on mechanical properties of particulate-polymer composites." Composites Part B: Engineering 39.6 (2008): 933-961.

W. C. J. Zuiderduin, C. Westzaan, J. Huétink, and R. J. Gaymans, "Toughening of polypropylene with calcium carbonate particles," Polymer (Guildf)., vol. 44, No. 1, pp. 261-275, Jan. 2003, doi: 10.1016/S0032-3861(02)00769-3.

W. Thongruang, R. J. Spontak, and C. M. Balik, "Correlated electrical conductivity and mechanical property analysis of high-density polyethylene filled with graphite and carbon fiber," Polymer (Guildf)., vol. 43, No. 8, pp. 2279-2286, Apr. 2002, doi: 10.1016/S0032-3861(02)00043-5.

American Institute of Steel Construction, "Structural Steel: An Industry Overview." American Institute of Steel Construction, 2018, [Online]. Available: https://www.aisc.org/globalassets/aisc/publications/white-papers/structural_steel_industry_overview_2018.pdf.

A. Kamczyc, "World Steel Association releases paper on CO2 emission reduction," Recycling Today, 2021. https://www.recyclingtoday.com/article/worldsteel-co2-report.

R. Rowell, J. Youngquist, and Y. Imamura, "Strength Tests on Acetylated Aspen Flakeboards Exposed to a Brown-Rot fungus," Wood Fiber Sci., vol. 20, No. 2, pp. 266-271, 1988, [Online]. Available: https://wfs.swst.org/index.php/wfs/article/view/1023/1023.

C. B. Vick, "Adhesion of Phenol-Formaldehyde Resin to Waterborne Emulsion Preservatives in Aspen Veneer," For. Prod. J., vol. 40, No. 11-12, pp. 25-30, 1990, [Online]. Available: https://heronet.epa.gov/heronet/index.cfm/reference/download/reference_id/5937217.

G. Churkina et al., "Buildings as a global carbon sink," Nat. Sustain., vol. 3, No. 4, pp. 269-276, 2020, doi: 10.1038/s41893-019-0462-4.

O. A. B. Hassan and C. Johansson, "Glued laminated timber and steel beams: A comparative study of structural design, economic and environmental consequences," J. Eng. Des. Technol., vol. 16, No. 3, pp. 398-417, Jul. 2018, doi: 10.1108/JEDT-12-2017-0130/FULL/XML.

A. Buchanan, S. John, and S. Love, "Life cycle assessment and carbon footprint of multi-storey timber buildings compared with steel and concrete buildings."

F. Morris, S. Allen, and W. Hawkins, "On the embodied carbon of structural timber versus steel, and the influence of LCA methodology," Build. Environ., vol. 206, p. 108285, Dec. 2021, doi: 10.1016/J.BUILDENV.2021.108285.

M. Yauk, J. Stenson, M. Donor, and K. Van Den Wymelenberg, "Evaluating Volatile Organic Compound Emissions from Cross-Laminated Timber Bonded with a Soy-Based Adhesive," Build. 2020, vol. 10, p. 191, vol. 10, No. 11, p. 191, Oct. 2020, doi: 10.3390/BUILDINGS10110191.

R. Yang et al., "Effects of freeze-thaw cycles on physical and mechanical properties of glulam exposed to outdoor environment," J. Renew. Mater., vol. 9, No. 7, pp. 1293-1307, 2021, doi: 10.32604/JRM.2021.015296.

T. Bowers, M. E. Puettmann, I. Ganguly, and I. Eastin, "Cradle-to-Gate Life-Cycle Impact Analysis of Glued-Laminated (Glulam) Timber: Environmental Impacts from Glulam Produced in the US Pacific Northwest and Southeast*," For. Prod. J., vol. 67, No. 5-6, pp. 368-380, Sep. 2017, doi: 10.13073/FPJ-D-17-00008.

NSF Award Search: Award # 1935723—INSPIRE: Engineering Sustainable Bio-adhesives from Algae for the Built Environment, 2019. https://www.nsf.gov/awardsearch/showAward?AWD_ID=1935723&HistoricalAwards=false (accessed Mar. 8, 2022).

Worldsteel, "Life cycle inventory (LCI) study 2020 data release Seventh global LCI study for steel products 2020 LCI Study Report," 2020.

C. X. Chen, F. Pierobon, and I. Ganguly, "Life Cycle Assessment (LCA) of Cross-Laminated Timber (CLT) Produced in Western Washington: The Role of Logistics and Wood Species Mix," Sustain. 2019, vol. 11, No. 5, p. 1278, Feb. 2019, doi: 10.3390/SU11051278.

H. K. Reddy et al., "Temperature effect on hydrothermal liquefaction of Nannochloropsis gaditana and *Chlorella* sp.," Appl. Energy, vol. 165, 943-951, 2016, doi: 10.1016/j.apenergy.2015.11.067.

Muppaneni, Tapaswy, et al. "Hydrothermal liquefaction of Cyanidioschyzon merolae and the influence of catalysts on products." Bioresource technology 223 (2017): 91-97.

Dandamudi, Kodanda Phani Raj, et al . . . "Recycle of nitrogen and phosphorus in hydrothermal liquefaction biochar from Galdieria sulphuraria to cultivate microalgae" Resouces, Conservation and Recycling 171 (2021) 105644.

(56) References Cited

OTHER PUBLICATIONS

Dandamudi, Kodanda Phani Raj, et al. "Hydrothermal liquefaction of green microalga *Kirchneriella* sp. under sub-and super-critical water conditions." Biomass and bioenergy 120 (2019): 224-228.
F. Yang et al., "Boosting electrochemical CO2 reduction on ternary heteroatoms-doped porous carbon," Chem. Eng. J., vol. 425, p. 131661, Dec. 2021, doi: 10.1016/J.CEJ.2021.131661.
J. Luo et al., "Interface engineering of metal phosphide on hollow carbons by Dual-template method for High- performance Lithium-sulfur batteries," Chem. Eng. J., vol. 433, p. 133549, Apr. 2022, doi: 10.1016/J.CEJ.2021.133549.
Y. Zhang et al., "Ultra-high surface area and nitrogen-rich porous carbons prepared by a low-temperature activation method with superior gas selective adsorption and outstanding supercapacitance performance," Chem. Eng. J., vol. 355, pp. 309-319, Jan. 2019, doi: 10.1016/J.CEJ.2018.08.169.
J. Zhang et al., "Facile Preparation of Biomass-Derived Mesoporous Carbons for Highly Efficient and Selective SO2 Capture," Ind. Eng. Chem. Res., vol. 58, No. 32, pp. 14929-14937, Aug. 2019, doi: 10.1021/ACS.IECR.9B01938/SUPPL_FILE/IE9B01938_SI 001. PDF.
P. Zhang et al., "A new choice of polymer precursor for solvent-free method: Preparation of N-enriched porous carbons for highly selective CO2 capture," Chem. Eng. J., vol. 355, pp. 963-973, Jan. 2019, doi: 10.1016/J.CEJ.2018.08.219.
S. Chen et al., "Simultaneous and efficient removal of Cr(VI) and methyl orange on LDHs decorated porous carbons," Chem. Eng. J., vol. 352, pp. 306-315, Nov. 2018, doi: 10.1016/J.CEJ.2018.07.012.
F. Yang et al., "Synthesis of Porous Carbons with High N-Content from Shrimp Shells for Efficient CO2-Capture and Gas Separation," ACS Sustain. Chem. Eng., vol. 6, No. 11, pp. 15550-15559, Nov. 2018, doi: 10.1021/ACSSUSCHEMENG.8B03995/SUPPL_FILE/SC8B03995_SI_001.PDF.
J. Wang et al., "Controllable synthesis of bifunctional porous carbon for efficient gas-mixture separation and high-performance supercapacitor," Chem. Eng. J., vol. 348, pp. 57-66, Sep. 2018, doi: 10.1016/J.CEJ.2018.04.188.
S. Chen et al., "Enhanced Cr(VI) removal by polyethylenimine- and phosphorus-codoped hierarchical porous carbons," J. Colloid Interface Sci., vol. 523, pp. 110-120, Aug. 2018, doi: 10.1016/J.JCIS.2018.03.057.
M. Zhou, J. Gomez, B. Li, Y. B. Jiang, and S. Deng, "Oil tea shell derived porous carbon with an extremely large specific surface area and modification with MnO2 for high-performance supercapacitor electrodes," Appl. Mater. Today, vol. 7, pp. 47-54, Jun. 2017, doi: 10.1016/J.APMT.2017.01.008.
M. Zhou, J. Catanach, J. Gomez, S. Richins, and S. Deng, "Effects of Nanoporous Carbon Derived from Microalgae and Its CoO Composite on Capacitance," ACS Appl. Mater. & Interfaces, vol. 9, No. 5, pp. 4362-4373, Sep. 2016, doi: 10.1021/acsami.6b08328.
J. Wang, R. Krishna, T. Yang, and S. Deng, "Nitrogen-rich microporous carbons for highly selective separation of light hydrocarbons," J. Mater. Chem. A, vol. 4, No. 36, pp. 13957-13966, Sep. 2016, doi: 10.1039/C6TA04939G.
Z. Dong et al., "Ultramicroporous carbon granules with narrow pore size distribution for efficient CH4 separation from coal-bed gases," AlChE J., vol. 67, No. 9, p. e17281, Sep. 2021, doi: 10.1002/AIC.17281.
B. Yuan, J. Wang, Y. Chen, X. Wu, H. Luo, and S. Deng, "Unprecedented performance of N-doped activated hydrothermal carbon towards C2H6/CH4, CO2/CH4, and CO2/H2 separation," J. Mater. Chem. A, vol. 4, No. 6, pp. 2263-2276, Feb. 2016, doi: 10.1039/C5TA08436A.
Wang, Jun, et al. "Nitrogen-doped porous carbons for highly selective CO2 capture from flue gases and natural gas upgrading." Materials Today Communications 4 (2015): 156-165.
Y. Liu, Y. Gu, Y. Hou, Y. Yang, S. Deng, and Z. Wei, "Hydrophobic activated carbon supported Ni-based acid-resistant catalyst for selective hydrogenation of phthalic anhydride to phthalide," Chem. Eng. J., vol. 275, pp. 271-280, Sep. 2015, doi: 10.1016/J.CEJ.2015.04.051.
Deng, "Adsorption of CO2, CH4, and N2 on Ordered Mesoporous Carbon: Approach for Greenhouse Gases Capture and Biogas Upgrading," Environ. Sci. & Technol., vol. 47, No. 10, pp. 5474-5480, May 2013, doi: 10.1021/es4000643.
J. Huang et al., "Nickel Nanoparticles with Narrow Size Distribution Confined in Nitrogen-Doped Carbon for Efficient Reduction of CO2 to CO," Catal. Lett. 2021 1522, vol. 152, No. 2, pp. 600-609, May 2021, doi: 10.1007/S10562-021-03662-0.
Liu, Fan, et al. "Facile preparation of N and O-rich porous carbon from palm sheath for highly selective separation of CO2/CH4/N2 gas-mixture." Chemical Engineering Journal 399 (2020): 125812.
F. Yang et al., "Scalable strategy to fabricate single Cu atoms coordinated carbons for efficient electroreduction of CO2 to CO," Carbon N. Y., vol. 168, pp. 528-535, Oct. 2020, doi: 10.1016/J.CARBON.2020.06.088.
Y. Huang et al., "Enhanced performance and electrocatalytic kinetics on porous carbon-coated SnS microflowers as efficient Li—S battery cathodes," Electrochim. Acta, vol. 343, p. 136148, May 2020, doi: 10.1016/J.ELECTACTA.2020.136148.
Y. Zhong et al., "Functionalized Biochar with Superacidity and Hydrophobicity as a Highly Efficient Catalyst in the Synthesis of Renewable High-Density Fuels," ACS Sustain. Chem. Eng., vol. 8, No. 21, pp. 7785-7794, Jun. 2020, doi: 10.1021/ACSSUSCHEMENG.9B07367/SUPPL_FILE/SC9B07367_SI_001.PDF.
S. Chen et al., "In situ transformation of LDH into hollow cobalt-embedded and N-doped carbonaceous microflowers as polysulfide mediator for lithium-sulfur batteries," Chem. Eng. J., vol. 385, p. 123457, Apr. 2020, doi: 10.1016/J.CEJ.2019.123457.
Zhang, Peixin, et al. "Algae-derived N-doped porous carbons with ultrahigh specific surface area for highly selective separation of light hydrocarbons." Chemical Engineering Journal 381 (2020): 122731.
W. Luc, M. Jouny, J. Rosen, and F. Jiao, "Carbon dioxide splitting using an electro-thermochemical hybrid looping strategy," Energy Environ. Sci., vol. 11, No. 10. 2018, doi: 10.1039/c8ee00532j.
T. Nosaka, R. Lankone, P. Westerhoff, and P. Herckes, "Flame retardant performance of carbonaceous nanomaterials on polyester fabric," Polym. Test., vol. 86, p. 106497, Jun. 2020, doi: 10.1016/J.POLYMERTESTING.2020.106497.
M. H. Al-Saleh and U. Sundararaj, "Review of the mechanical properties of carbon nanofiber/polymer composites," Compos. Part A Appl. Sci. Manuf., vol. 42, No. 12, pp. 2126-2142, Dec. 2011, doi: 10.1016/J.COMPOSITESA.2011.08.005.
M. Choudhury, H. Singh Bindra, J. Mittal, and R. Nayak, "Evaluation of mechanical properties of carbon HDPE composites," Mater. Today Proc., vol. 47, pp. 6712-6718, 2020, doi: 10.1016/J.MATPR.2021.05.119.

* cited by examiner

CARBON NEGATIVE WOOD-PLASTIC COMPOSITES FROM CARBON DIOXIDE

CROSS-REFERENCE TO RELATED APPLICATION

This application claims the benefit of U.S. Patent Application No. 63/322,117 filed on Mar. 21, 2022, which is incorporated herein by reference in its entirety.

TECHNICAL FIELD

This invention relates to functionalizing carbon obtained from direct air capture of carbon dioxide for use in the fabrication of materials including wood-plastic composites, as well as the resulting wood-plastic composites.

BACKGROUND

U.S. building construction and operation accounts for almost half of the country's $CO_2$ emissions. Together, steel and concrete make up more than half of structural materials used in nonresidential and multistory residential buildings in the U.S. steel and cement production accounts for over 10 percent of global $CO_2$ emissions. As the world continues to urbanize and cities become denser, demand for multistory buildings and for building materials increases.

SUMMARY

This disclosure describes a building material made from carbon-reinforced waste plastic and wood products by a process that captures, stores, and uses atmospheric $CO_2$. Sustainable biocomposites including wood fibers, waste plastic, and carbonaceous materials are fabricated. Functionalized carbon is used as reinforcement in wood-plastic composites to improve the mechanical properties. As used herein, "functionalized carbon" generally refers to carbon that has been modified by the covalent attachment of chemical groups, by increasing the degree of graphitization, or both. The chemical functionalization of the carbon meets the overall properties and compatibility for wood composites. Strong interfacial adhesion between carbonaceous material and wood matrices can be achieved by providing polar functional groups as bridges between cellulosic wood fibers and graphene-like carbon surface, resulting in carbon negative bio-based wood composites with satisfactory mechanical properties. As used herein, a "carbon negative composite" generally refers to a composite formed at least partially from carbon derived from carbon dioxide removed from the atmosphere. Post treatments to enhance layer bonding, such as applying additional compaction, thermal treatment, or binding agents, can improve interface bonding between 3D printed layers that may cause delamination.

In a first general aspect, fabricating a wood-plastic composite includes capturing carbon dioxide from air, providing the carbon dioxide to algae, harvesting the algae, liquefying the algae to yield biochar, treating the biochar to yield functionalized carbon, and combining the functionalized carbon, wood flour, and a plastic feedstock to yield the wood-plastic composite.

Implementations of the first general aspect can include one or more of the following features.

In some cases, capturing carbon dioxide from air includes direct air capture processes. The algae can include red algae, green algae, or both. In some implementations, the algae include one or more of Kirchneriella sp., *Nannochloropsis* gaditana, and *Chlorella* sp. In some cases, liquefying the algae includes a hydrothermal liquefaction process. The hydrothermal liquefaction process can be carried out in a temperature range of about 150° C. to about 350° C. and at a pressure less than or equal to about 20 MPa. In some implementations, the plastic feedstock includes mixed waste plastics. In some cases, the plastic feedstock includes high density polyethylene terephthalate, low density polyethylene terephthalate, or both. Treating the biochar can include exfoliating the biochar under ultrasonic cavitation. In some implementations, the first general aspect further includes providing the wood-plastic composite to an additive manufacturing apparatus. The first general aspect can further include fabricating, with the additive manufacturing apparatus, a structural component including the wood-plastic composite. The structural component can include a board.

In a second general aspect, fabricating a wood-plastic composite includes capturing carbon dioxide from air, converting the carbon dioxide to solid carbon and molecular oxygen, treating the solid carbon to yield functionalized carbon, and combining the functionalized carbon, wood flour, and a plastic feedstock to yield the wood-plastic composite.

Implementations of the second general aspect can include one or more of the following features.

In some cases, the second general aspect further includes combining the functionalized carbon with the plastic feedstock before combining the functionalized carbon, wood flour, and a plastic feedstock to yield the wood-plastic composite. The plastic feedstock can include mixed waste plastics. In some implementations, the plastic feedstock includes high density polyethylene terephthalate, low density polyethylene terephthalate, or both. In some cases, converting the carbon dioxide to solid carbon and molecular oxygen includes an electro-thermochemical process. The functionalized carbon can include one or more of hydroxyl groups, alkyl groups, amino groups, carboxylates, oxidized nitrogen, aldehydes, ketones, pyrrolic nitrogen, epoxies, pyridines, graphitic nitrogen, ethers, maleic anhydride-grafted polypropylene, maleic anhydride-grafted polyethylene, aminosilane crosslinkers, and related functional groups.

In some cases, treating the solid carbon includes irradiating the solid carbon with microwave radiation to yield graphitic carbon platelets. In some implementations, treating the solid carbon includes one or more of ball milling, ball grinding, sonication, and shear mixing. In some cases, the second general aspect further includes providing the wood-plastic composite to an additive manufacturing apparatus. The second general aspect can further include fabricating, with the additive manufacturing apparatus, a structural component including the wood-plastic composite.

In a third general aspect, a wood-plastic composite includes mixed waste plastic, wood flour, and functionalized carbon.

Implementations of the third general aspect can include one or more of the following features.

In some cases, the functionalized carbon includes graphitic carbon. In some cases, the functionalized carbon includes one or more of hydroxyl groups, alkyl groups, amino groups, carboxylates, oxidized nitrogen, aldehydes, ketones, pyrrolic nitrogen, epoxies, pyridines, graphitic nitrogen, ethers, maleic anhydride-grafted polypropylene, maleic anhydride-grafted polyethylene, aminosilane crosslinkers, and related functional groups. In some implementations, the third general aspect further includes a filler. The filler can include $SiO_2$, glass, $Al_2O_3$, $Mg(OH)_2$, or $CaCO_3$. In some cases, the filler includes micron-sized biogenic carbon from algae.

The disclosed carbon negative wood-plastic composites are stronger, lighter, more durable, and less flammable than current manufactured woods as alternatives to energy- and resource-intensive steel and concrete. Unlike cross-laminated timber (CLT), the disclosed material does not require slow-growing timber and will not weaken from rot, decay, and freeze-thaw cycles, allowing the wood-plastic composites to be scaled across climates without concerns about deforestation. By reinforcing waste-derived plastics with functionalized carbon produced biogenically from algae or electro-thermochemically from $CO_2$ captured from air, carbon negative wood-plastic composites are fabricated with improved characteristic in areas of flammability and irreversible deformation under prolonged stress (e.g., creep) compared with conventional composites. Because the wood-plastic composites can be used in additive manufacturing (3D printing) processes, structural elements of any shape and size can be made with less material, labor, and cost than required for other structural materials. For example, a 16-foot beam made of the disclosed wood-plastic composite is expected to cost one tenth of a 16-foot CLT beam. The disclosed wood-plastic composites can replace CLT, glulam, and possibly steel and concrete in some buildings as structural components, transforming how multistory structures are designed and built while substantially reducing greenhouse gas emissions.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1:
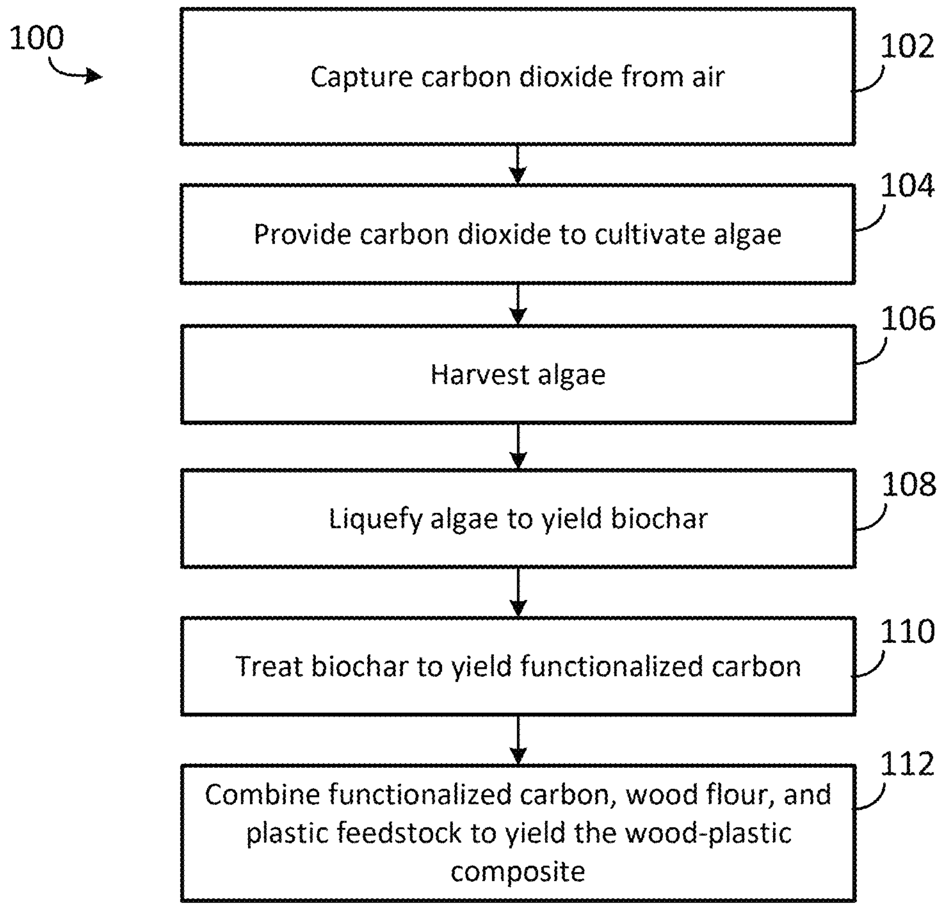
FIG. 1 is a flow chart showing operations in a process of fabricating a wood-plastic composite using functionalized carbon derived from algal biochar.

This disclosure describes carbon negative wood-plastic composites made from carbon-reinforced waste plastic and wood products by a process that captures, stores, and uses atmospheric $CO_2$. $CO_2$ obtained from direct air capture (DAC) is converted biogenically and electro-thermochemically to solid carbon. As used herein, a "carbon negative composite" generally refers to a composite formed at least partially from carbon derived from carbon dioxide removed from the atmosphere. The solid carbon is processed to form graphitic carbon platelets that can be chemically functionalized with hydrophobic groups, polar groups, or both to yield functionalized carbon. As used herein, "functionalized carbon" generally refers to carbon that has been modified by the covalent attachment of chemical groups, by increasing the degree of graphitization, or both. Due at least in part to the hydrophobic nature of plastics and hydrophilic nature of wood flour, the use of functionalized carbon as coupling agents and reinforcement in wood-plastic composites can improve the structural properties of the composites. As used herein, "wood flour" generally refers to finely powdered wood or sawdust. Functionalized carbon can act as a bridge between wood flour particles and plastic polymers by facilitating intermolecular interactions between the functional groups on the functionalized carbon and components in the wood flour particles and polymers. The functionalized carbon can also be combined with bulk plastic polymer to increase the strength and flame resistance of the functionalized carbon-polymer composite.

Atmospheric carbon dioxide obtained by DAC feeds two carbon production processes: 1) $CO_2$ cultivation of algae and the conversion of the algal biomass to carbon using hydrothermal liquefaction (HTL); and 2) electro-thermochemical conversion of the $CO_2$ to $O_2$ and amorphous carbon. The amorphous electro-thermochemically generated carbon is further treated using radiative microwave heating to convert it to graphitic carbon platelets. The increased graphitic structure of the carbon improves the strength and flame resistance of the wood-plastic composites to which it is added. The electro-thermochemical graphitic carbon platelets can be chemically functionalized to facilitate the formation of intermolecular interactions between the added carbon and other wood-plastic composite constituents, leading to increased mechanical strength and creep resistance. The algae-derived biochar carbon production process itself produces functionalized biogenic graphitic carbon, which can be exfoliated under ultrasonic cavitation to produce the functionalized carbon. The biogenically generated functionalized carbon can be further treated by an additional functionalization step in order to improve the wood-plastic interfacial adhesion properties.

In the carbon negative wood-plastic composites, micron-sized biogenic functionalized carbon (e.g., from algae) acts at the wood/plastic interface to compatibilize and bind these materials to improve wood-plastic composite strength. Functionalized graphitic carbon platelets (made by electro-thermochemical process) are added as reinforcement within the plastic bulk or within the wood-plastic mixture. Density functional theory (DFT)-based molecular modeling data indicates polar functional groups attached to the carbon act as anchoring units for adsorption on cellulosic wood flour particles to make the wood flour particles compatible in the plastic polymer matrix. In addition to increasing elastic modulus of the composite, the functionalized carbon also improves creep resistance of wood-plastic composite by restricting polymer chain entanglement. Functionalization of the graphitic carbon platelets is tailored to maximize stress transfer to enhance composite strength. The functionalized carbon, wood flour particles, and compatibilized recycled plastic composite can be additively manufactured (e.g., 3D printed) into structural material (e.g., boards).

FIG. 1 is a flow chart showing operations in a process 100 of fabricating a wood-plastic composite using functionalized carbon derived from algal biochar. In 102, atmospheric $CO_2$ is captured from air. The capturing can include direct air capture (DAC) processes. The DAC processes can include passive processes as well as active processes that move air.

In 104, the carbon dioxide captured from air is provided to cultivate algae. Both red and green algae can be used for feedstock. Suitable species of algae include Kirchneriella sp., *Nannochloropsis* gaditana, and *Chlorella* sp. In 106, the algae are harvested.

In 108, the harvested algae are liquefied to yield biochar. The algae can be liquefied using hydrothermal liquefaction (HTL) methods. In one example, the HTL process is carried out in a temperature range of about 150° C. to about 350° C. and at a pressure less than or equal to about 20 MPa.

In 110, the biochar is treated to yield functionalized carbon. In some cases, the functionalization is achieved by the HTL process on the algae. The functionalized carbon produced by HTL of algae can provide both oxidizing and reducing properties required to yield the disclosed carbon composite materials. Treating the biochar can include exfoliating the biochar under ultrasonic cavitation.

In 112, the functionalized carbon, wood flour, and plastic feedstock are combined to yield the wood-plastic composite. The plastic feedstock can include mixed waste plastics. The plastic feedstock can include high density polyethylene terephthalate or low-density polyethylene terephthalate. The functionalized carbon reinforces the wood-plastic composite, improving its strength and acting as a coupling agent for the interface between plastic and wood. The functional groups attached to the functionalized carbon can interact covalently, electrostatically, or both with the wood particles, the plastic polymers, or both.

The wood-plastic composite can be provided to an additive manufacturing apparatus. A structural component including the wood-plastic composite can be fabricated with the additive manufacturing apparatus. The structural component can include a board.

Figure 2:
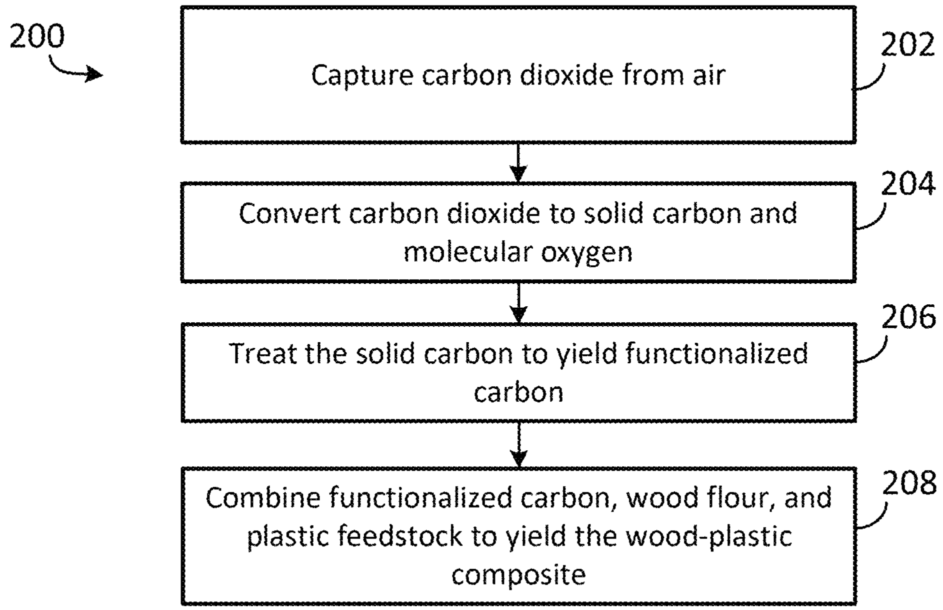
FIG. 2 is a flow chart showing operations in a process of fabricating a wood-plastic composite using functionalized carbon derived from converted carbon dioxide.

FIG. 2 is a flow chart showing operations in a process 200 of making wood-plastic composites by converting captured $CO_2$ to carbon and $O_2$. In 202, atmospheric $CO_2$ is captured from air. The capturing can include DAC processes. The DAC processes can include passive process as well as active processes that move air.

In 204, the carbon dioxide captured from air is converted to solid carbon and molecular oxygen ($O_2$). The carbon dioxide can be converted to solid carbon and $O_2$ using electro-thermochemical methods. The electro-thermochemical methods can combine electrochemical steps and thermochemical steps.

In 206, the solid carbon is treated to yield functionalized carbon. Functional groups coupled to the functionalized carbon can include hydroxyl groups, alkyl groups, amino groups, carboxylates, oxidized nitrogen, aldehydes, ketones, pyrrolic nitrogen, epoxies, pyridines, graphitic nitrogen, ethers, maleic anhydride-grafted polypropylene, maleic anhydride-grafted polyethylene, aminosilane crosslinkers, and related functional groups. In some cases, treating the solid carbon includes irradiation with microwave radiation to yield graphitic carbon platelets. Treating the solid carbon can include physical processes (e.g., ball milling, ball grinding, sonication, or shear mixing).

In 208, the functionalized carbon, wood flour, and plastic feedstock are combined to yield the wood-plastic composite. The plastic feedstock can include mixed waste plastics. In some cases, the functionalized carbon is combined with the plastic feedstock before combining the functionalized carbon, wood flour, and a plastic feedstock to yield the wood-plastic composite. The wood-plastic composite can be provided to an additive manufacturing apparatus. A structural component including the wood-plastic composite can be fabricated with the additive manufacturing apparatus.

A wood-plastic composite includes mixed waste plastic, wood flour, and functionalized carbon. Functional groups coupled to the functionalized carbon can include hydroxyl groups, alkyl groups, amino groups, carboxylates, oxidized nitrogen, aldehydes, ketones, pyrrolic nitrogen, epoxies, pyridines, graphitic nitrogen, ethers, maleic anhydride-grafted polypropylene, maleic anhydride-grafted polyethylene, aminosilane crosslinkers, and related functional groups. The wood-plastic can further include a filler (e.g., $SiO_2$, glass, $Al_2O_3$, $Mg(OH)_2$, $CaCO_3$). The filler can include micron-sized biogenic carbon from algae. The wood-plastic composite can be used to form structural components, such as building materials.

EXAMPLES

The compatibility between the wood and plastic can be controlled based at least in part on the type of intermolecular interactions (e.g., covalent or electrostatic) established at the wood-polymer interface. These intermolecular interactions depend on the molecular structure of the coupling agent. Therefore, it can be advantageous to determine the molecular mechanism of interactions between the wood flour particles and the plastic polymers with the functional groups the coupling agent. Density functional theory (DFT) can model intermolecular interactions between functional groups attached to the carbon and cellulosic wood flour particles. Table 1 ranks preliminary DFT results of functional groups that bind most strongly (top to bottom) to the cellulose structure as initial targets to optimize carbon functionalization to improve wood-polymer interfacial interactions.

TABLE 1

Interaction energy ($E_{int}$) for adsorption of the functional group on the cellulosic molecular unit.

| Functional Group | $E_{int}$ (kcal/mol) |
|---|---|
| Amine | −19.7 |
| Carboxylate | −18.6 |
| Oxidized N | −15.4 |
| Aldehyde | −12.6 |
| ketone | −12.1 |
| Pyrrolic N | −11.1 |
| Epoxy | −10.5 |
| Pyridine | −9.4 |
| Graphitic N | −9.0 |
| Ether | −7.9 |

Figure 3A:
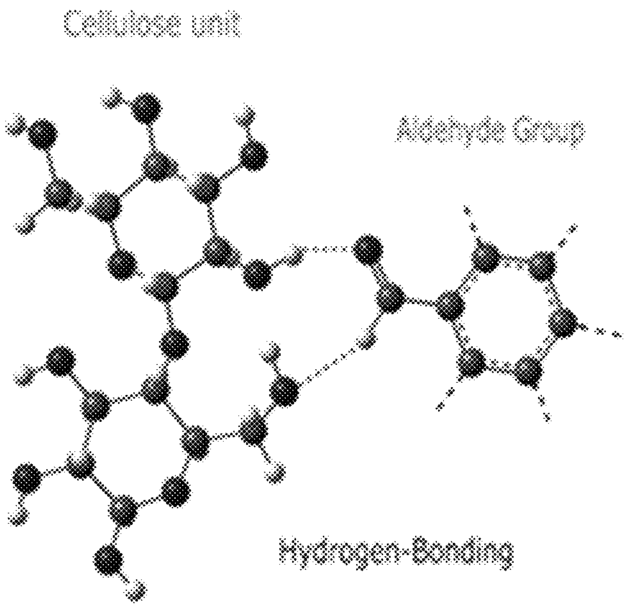
FIGS. 3A-3D depict intermolecular interactions of aldehyde and epoxy functionalization with cellulose.
Figure 3B:
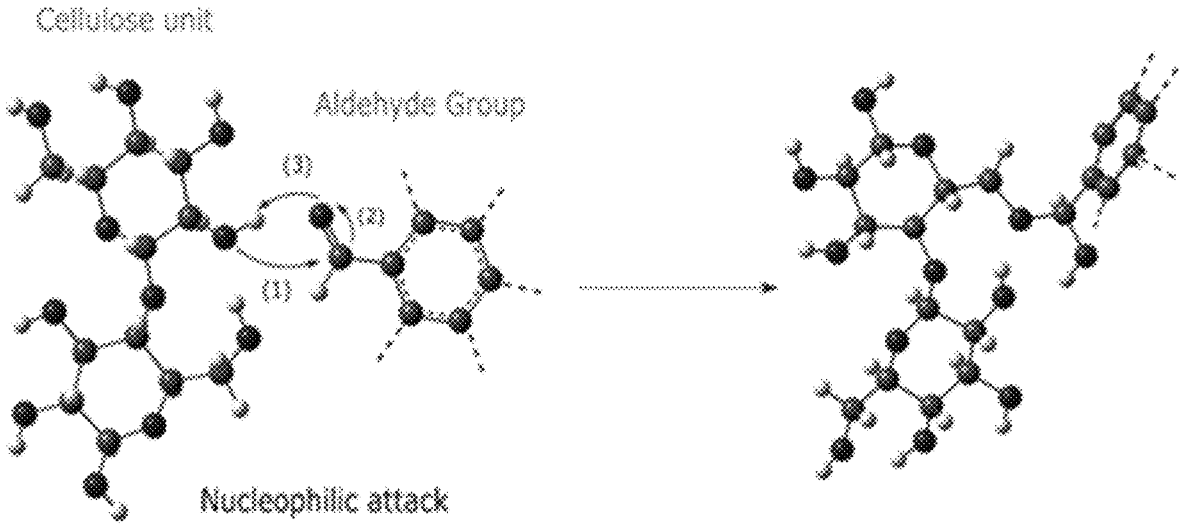
Figure 3C:
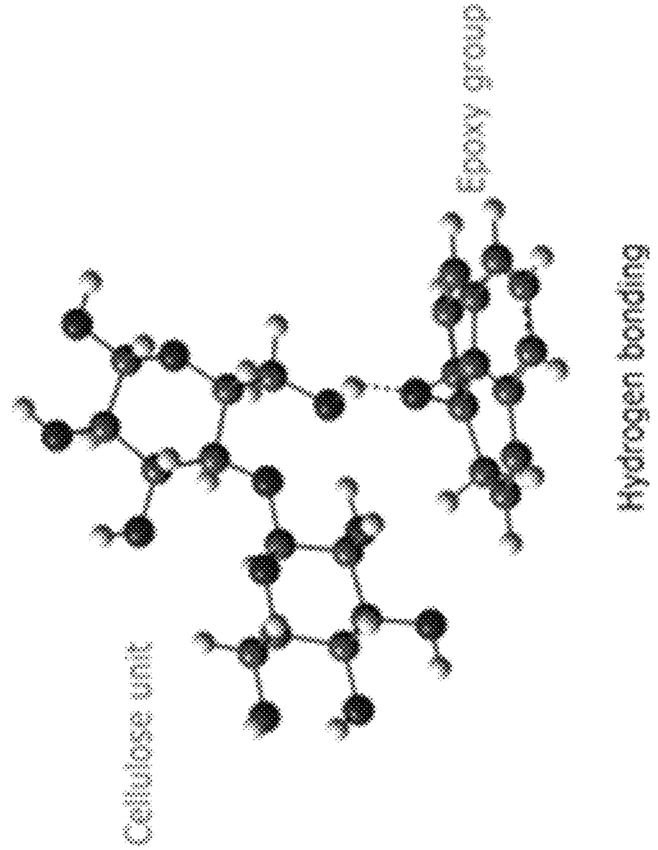
Figure 3D:
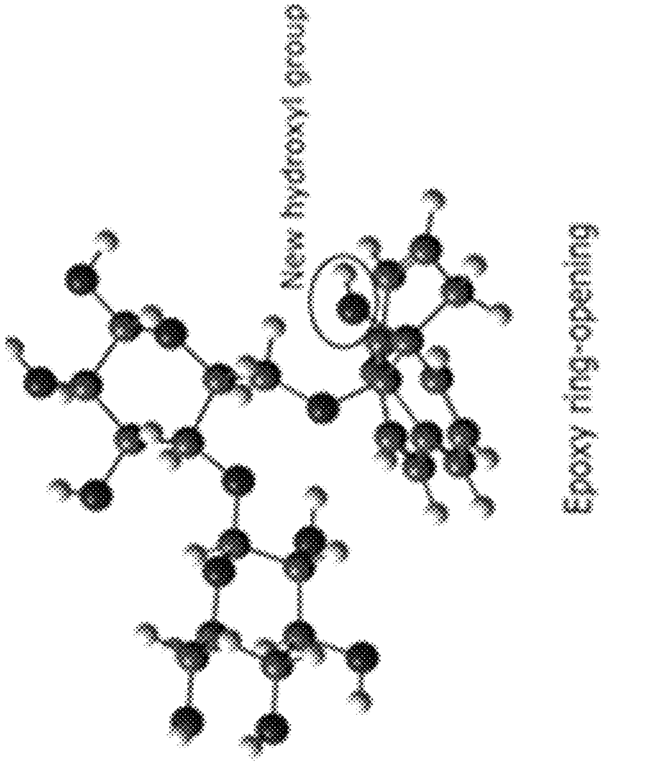

A common functional group on the surface of cellulosic wood flour particles is hydroxyl (—OH). DFT calculations confirmed that hydroxyl groups can form strong intermolecular hydrogen and covalent bonds with polar functional groups attached to the carbon structure, such as aldehyde and epoxy as shown in FIGS. 3A-3D. FIGS. 3A and 3B depict an aldehyde group interacting with hydroxyl groups of cellulose via hydrogen bonding and nucleophilic attack, respectively. FIGS. 3C and 3D depict an epoxy group interacting with the hydroxyl groups of cellulose by hydrogen bonding and a ring opening reaction, respectively. As a result of these types of interactions, strong interfacial adhesion between functionalized carbon and wood flour can be established. In a different structural region of the functionalized carbon, a graphene-like zone with attached saturated hydrocarbon chains can interact with polymers, such as low/high density polyethylene (LDPE/HDPE), via noncovalent interactions. These noncovalent interactions (e.g., CH-π0 and $CH_2$—$CH_2$ interactions) can influence the compatibility of the functionalized carbon with the plastic polymers. So, on the basis of DFT model interactions, carbon material functionalized with effective functional groups can act as a bridge between plastic polymers and wood cellulosic particles. This feature increases compatibility in the mixture, and subsequently, durability for the wood-plastic composite while achieving carbon negativity. DFT modeling suggests that by incorporating proper functional groups onto carbon particles, binding energy between wood flour and functionalized carbon can be increased by nearly 2.5 times (going from −7.9 to −19.7 kcal/mol). The plastics can be further reinforced using carbon; reinforcement of high-density polyethylene (HDPE) plastics can increase their modulus by 30-40%. Adding 1 wt % graphitic carbon to epoxy increases its strength by 20%, and when combined with 3D printing functionally graded elements can increase the moment of inertia of the wood-plastic composites to meet or exceed the strength of cross-laminated timber (CLT).

Composition and yield of algae-derived biochar. The $CO_2$ captured in a direct air capture (DAC) system can be used to cultivate algae for producing biochar and energy-dense biocrude oils in an HTL process. The biochar yield and biogenic carbon content can beinfluenced by the type of algal species used in, and the temperature of, the HTL process. 62% of biochar yield was obtained with *Nannochloropsis* gaditana as feedstock at 180° C. The biochar from the HTL of Kirchneriella sp. at 200° C. has an elemental composition of 66.0% C, 3.9% of H, 4.2% of N, 25.2% of O, and 0.7% of S. The high nitrogen concentration in the Kirchneriella-derived biochar could be useful for various applications, including carbon composite materials, electrodes, catalyst supports, and adsorbents for gas separation and purification.

Figure 4:
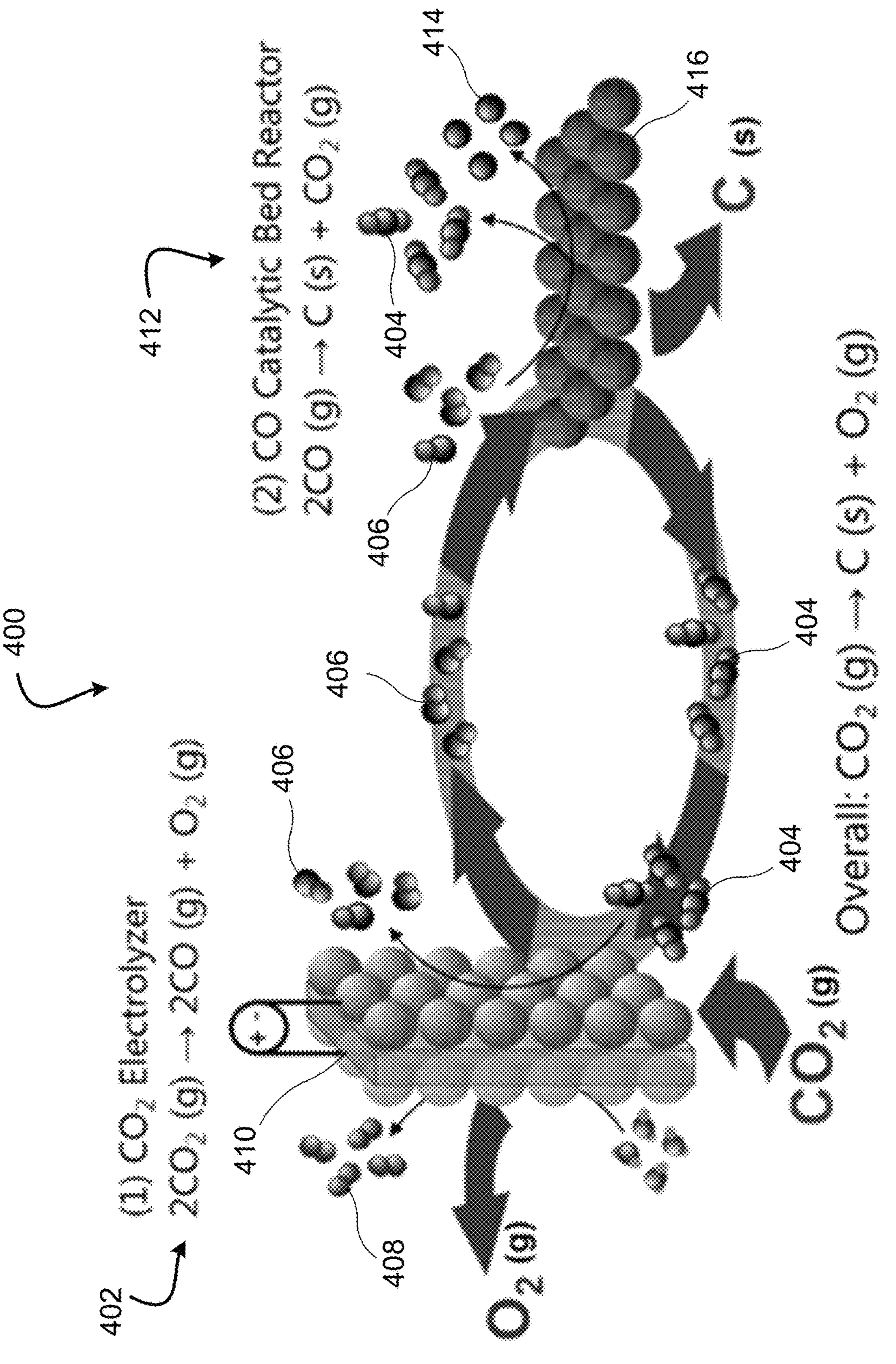
FIG. 4 is a schematic diagram of a hybrid electro-thermochemical process for $CO_2$ splitting into solid carbon and $O_2$.

Electro-thermal catalytic reduction of $CO_2$ into carbon. The splitting of $CO_2$ into solid carbon (C) and $O_2$ can be done using an electro-thermochemical hybrid looping (ETHL) process 400 as depicted in FIG. 4. Splitting $CO_2$ into C and $O_2$ is a thermodynamically challenging reaction that is difficult to accomplish using any existing electrochemical or thermochemical processes alone. ETHL process 400 combines an electrochemical step 402 that reduces $CO_2$ 404 into carbon monoxide (CO) 406 and $O_2$ 408 at electrode 410 with a thermochemical step 412 that further converts CO 406 into C 414 and $CO_2$ 404 at catalytic bed reactor 416. By recycling the produced $CO_2$ 404 from the thermochemical step 412 back to the first electrochemical step 402, the process loop is closed since C 414 and $O_2$ 408 are the only products. A 96% selectivity for the $CO_2$ electrochemical step 402 and a nearly 100% selectivity for the CO thermochemical step 412 has been achieved.

Carbon functionalization. A coal-to-graphene (C2G) process converts amorphous carbon ores into graphitic carbon products containing "graphene-like" sheets of carbon. A C2G process can be used to build stronger and lighter building materials. Microwave-based selective heating treatment can convert amorphous carbon to graphitic carbon platelets (GCPs), which are of better thermal stability and conductivity, and mechanical strength than amorphous carbon. The nature of graphite makes GCPs stiffer and less flammable than plastic or wood (autoignition>500° C. vs<300° C.) while being less dense than alternative inorganic fillers that would otherwise decrease the strength-to-weight ratio.

Figure 5:
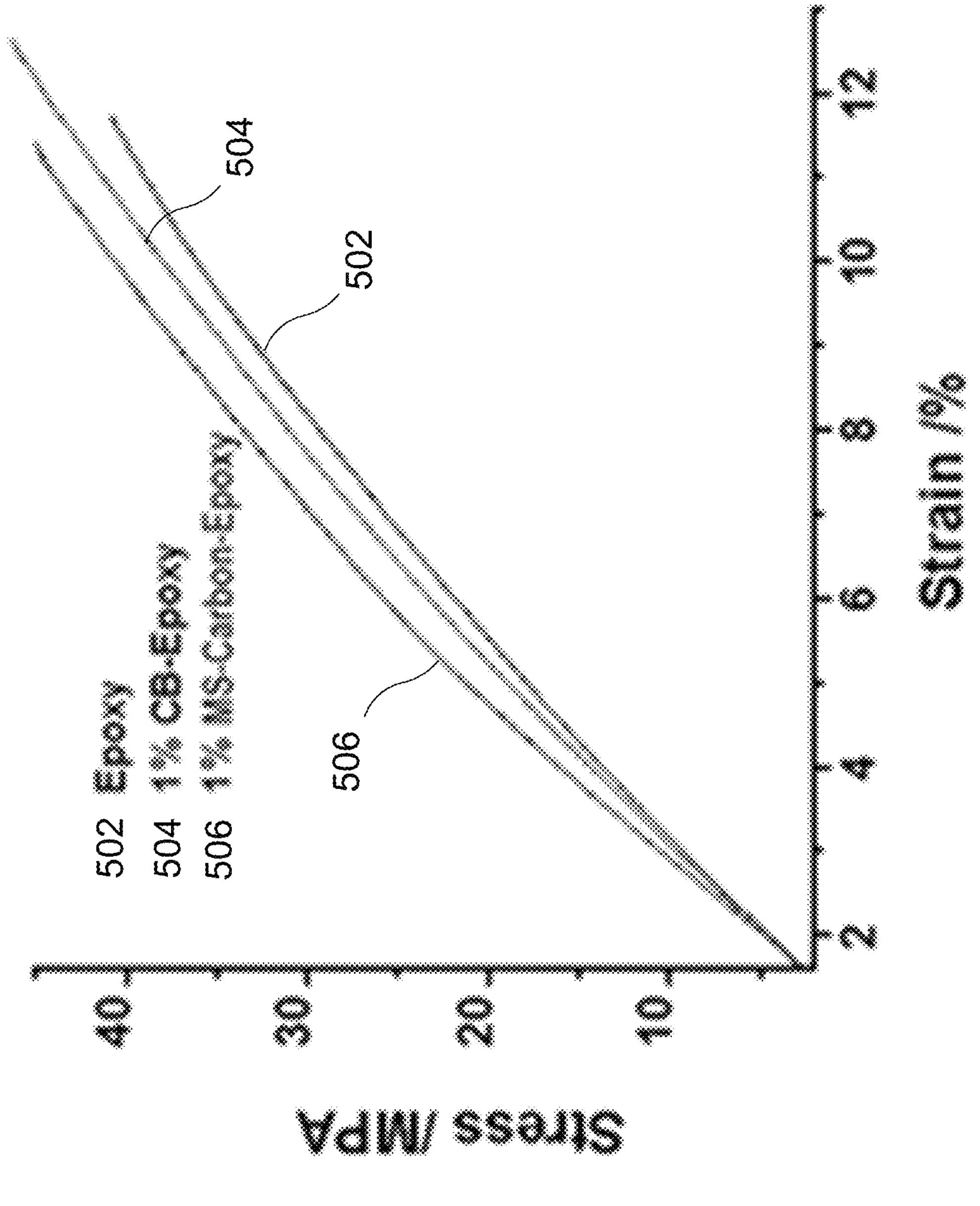
FIG. 5 shows stress versus strain for epoxy, epoxy with 1% carbon black, and epoxy with 1% graphitic carbon platelets.

FIG. 5 shows stress versus strain for neat epoxy 502, epoxy with 1% carbon black 504, and epoxy with 1% graphitic carbon platelets 506. The plots show that adding 1 wt % GCPs to an epoxy 506 increases its strength 20% compared to neat epoxy 502. Functional groups can activate the surface of the GPCs to establish stronger bonding interactions with the polymer matrix. The improved thermomechanical properties for polymer-GPC composites are attributed to the presence of functional groups that enhance compatibility and dispersion of the GPCs within the polymer matrix and reduce reduced GPC agglomeration.

In one example, a wood-plastic composite has a total of about 10 wt % carbon, including about 2.5 wt % carbon in plastics, and the rest of carbon at the interface between the wood and plastic, which, combined with proper compatibilizers and functionalization to enhance dispersion and reduce agglomeration, can lead to improvements in strength.

Evaluation of properties of carbon negative particles from algae and $CO_2$ electrolysis. A two-step process (carbonization and graphitization followed with exfoliation) is used to produce functionalized graphitic carbon platelets (GCP) to be incorporated into wood-plastic-carbon composites. Both red and green algal biomass is processed using established HTL methods (150-350° C.; ≤20 MPa) to yield biogenic graphitic carbon with 66% carbon. The algae-derived graphitic carbon is then exfoliated under ultrasonic cavitation to generate the GCP particles. The GCP particles may be further functionalized with hydroxyl groups to improve their mechanical and fire-deterrent properties. Established electro-thermochemical hybrid methods for reducing pure $CO_2$ to amorphous carbon as depicted in FIG. 4 is optimized based on the DAC $CO_2$ feedstock composition from MechanicalTree™. The carbon yield and properties are evaluated using synthetic gas mimicking DAC, while various design changes to the DAC process can be modeled to optimize feedstock for electrolysis.

Bio-carbon processing. HTL processing is analyzed to maximize the production rate of biogenic carbon from different algal species. Three algal species are used (Kirchneriella sp., *Nannochloropsis* gaditana, and *Chlorella* sp.) as the feedstock to produce biochar with varying concentrations of biogenic graphitic carbon at different HTL reaction temperatures, ranging from 150 to 350° C. The elemental composition of both fresh algae and algae-derived biochar can be analyzed. The biochar yield and carbon concentration are correlated with HTL conditions for the different algae species. Once the biogenic graphitic carbons are produced in the HTL process, the algae-derived graphitic carbon can then be exfoliated under ultrasonic cavitation to generate GCP particles. The main objective of this step is to increase the graphitic carbon concentration in the biogenic carbon samples.

Electro-thermal catalytic carbon production and processing. The DAC MechanicalTree™ front-end system produces a "crude" product including 90-95 vol % $CO_2$, saturated water, and balance of air, at 1-1.5 bar and just above ambient temperature, which can directly feed the electro-thermal catalytic reactor without further compression or purification. This is a batch process with sequential $CO_2$ capture and $CO_2$ release. Multiple collectors operating out of phase produce a pseudo-steady state product. Empirical results can be applied to derive the composition for an equivalent $CO_2$ feedstock to the electro-thermochemical process.

An electrolyzer design can be used to enable a high-rate $CO_2$-to-CO electrocatalytic conversion. A proton conductive polymer membrane was used that accumulates cations on the cathode side causing a substantial increase of cell potential during long-term operations. Additionally, $CO_2$ was introduced to the system through a liquid-gas contactor, which limited the maximum current density to be ~35 mA/cm$^2$. A silver-based membrane-electrode-assembly coupled with an anion exchange membrane can be constructed to achieve a much higher current density (>300 mA/cm$^2$) while maintaining a high CO selectivity (>90%).

On the CO catalytic bed reactor side, iron showed superior catalytic activity for CO conversion; however, the resulting solid carbon was mainly amorphous. To tune the atomic structure and morphology of solid carbon, a variety of nanostructured iron-, nickel-, and cobalt-based catalysts can be used as they are known to promote graphitic structure in fabricating nano-featured, micron sized carbon materials. The catalyst and synthesis conditions can be analyzed to determine how they affect the properties of the carbon products (e.g., graphitic structure, oxygen content, and particle size). A solid carbon production rate of 10 g/day can potentially be achieved.

Carbon particle functionalization. Several chemical processing methods can be identified that can produce carbon with functional groups, including amine and —OH groups, and state-of-the-art compatibilizers, e.g., maleic anhydride-grafted polypropylene (MAPP) and maleic anhydride-grafted polyethylene (MAPE), to improve their compatibility with wood-plastic composite. Physical processing approaches (e.g., ball milling/grinding, sonication, shear mixing) can also be used. The miscibility of GCP materials can be further engineered by adding different functional groups (e.g., aminosilane crosslinkers) to graft long polymer chains onto carbon particles to enhance entanglement with plastic components for 3D printing wood-plastic composite. Controlling the degree of functionalization can also impact the physical properties of the materials and can be used to improve thermal/electrical conductivity, tune the colors/optical properties of the materials, and engineer the interaction with composite matrices. The effects of the size of carbon fillers to the properties of wood-plastic composite can also be investigated.

The modified Hummer's method can be used to oxidize the surface of the carbon particles. The ratio of $H_2SO_4$:$H_3PO_4$ and the time during which the carbon particles are exposed to the solution can be varied to influence the overall concentration of functional groups on the particles and the ratio of —OH and epoxy groups on the particle surfaces. These functional groups can promote compatibility of the particles with the matrix, and can be further functionalized to alter the hydrophobicity, matrix adhesion, and more. For example, integrating the carbon particles into LDPE/HDPE may require further functionalization to introduce lipophilic behavior (e.g., hexanoic acid to improve the affinity for the polyolefin).

Evaluation of the feasibility of functionalizing carbon particles to improve performance. Advantages of wood-plastic-carbon composites include: (1) improved flame resistance, (2) improved mechanical properties, such as strength and creep resistance, and (3) suitable workability of precursors to enable on-demand 3D printing.

Flame resistance can be promoted by increasing the graphitic nature of the amorphous carbon particles generated from the DAC using fast and selective heating (microwave) processes. Graphitic carbon is also stiffer and far less flammable than plastic or wood (autoignition of graphitic carbon>500° C. vs<300° C. for plastic or wood) while being less dense than alternative inorganic fillers that would otherwise decrease the strength-to-weight ratio. Microwave technology provides an opportunity for modular and distributed solutions that transform low-value amorphous carbon feedstocks into high-value graphitic carbon for on-demand use. Microwave-based manufacturing processes can be used for making 50 gram-quantity micro sized (lateral size of 20-500 μm) GCP samples without heavily functionalizing the material. Physical processing approaches (e.g., milling/grinding, sonication, shear mixing) can also be used. These techniques will be analyzed to maximize the graphitic carbon yield, reduce/eliminate unwanted process waste/byproducts, and minimize processing times and energy footprints.

Improving mechanical properties. Mechanical properties can be promoted by grinding the particles into smaller pieces and incorporating chemical functional groups that promote particle dispersion and bonding to both the plastic and wood phase after curing to improve creep resistance. Due to the hydrophobic nature of plastics and hydrophilic nature of wood flour, it can be advantageous to use a coupling agent. In the disclosed wood-plastic composites, a coupling agent acts as a bridge between wood flour particles and polymers. Functionalized carbon is incorporated into the composite to facilitate proper coupling. The functionalized carbon design is informed by DFT-based molecular modeling and rheometry. Waste polyolefin plastics, particularly LDPE/HDPE, can be used. Some effective functional groups that promote carbon bonding to recycled LDPE/HDPE plastic are saturated alkane chains, amine, aldehyde, or epoxy groups that could bind the carbon particles to wood or each other to form a bonded network. DFT calculations can be conducted before carbon functionalization to suggest more effective functional groups and after functionalized carbon production to confirm its effectiveness as a coupling agent for wood-plastic composite.

Measuring carbon uptake and release. The carbon content of the wood flour, graphitic carbon platelets, 3D printing plastics, and composite materials can be measured using a carbon, hydrogen, nitrogen, sulfur (CHNS) elemental analyzer. The $CO_2$ loss or uptake rate of the feedstock and composite materials can be measured by monitoring the $CO_2$ concentration in a closed loop sample chamber using an infrared gas analyzer or gas chromatograph sensitive to exceedingly small changes in $CO_2$. Accelerated aging techniques can be used to measure the uptake rate at different stages of the life cycle of the material. Full carbon balances provide insights into the ability of the material to bind carbon.

Evaluating the feasibility of 3D printed wood-plastic materials. Wood-plastic materials can be 3D printed and tested for improved mechanical and thermal properties. Feedstock properties and printing system functions can be identified, printed composite microstructure evolution can be investigated, and composite structures can be fabricated. The effect of type and structure of carbon particles, as well as their concentration on performance properties of composites, can be analyzed to inform the engineering of wood-plastic composites with enhanced strength, thermal resistance, and flammability. Comparison and benchmarking can be done against commercial wood-plastic composites printed into 300 mm length boards using an existing printer. Eventually the comparison and benchmarking can be done using larger structural components (e.g., 8 foot boards). The design of wood-plastic composites can also be informed by the carbon counting and life cycle analysis (LCA); the composite's flow characteristics and rheological properties can be designed specifically to be 3D printed.

Characterizing material mixture properties. The complex viscosity measurements can be conducted using rheometry to study potential interactions between the functionalized carbon and composite constituents. A cone-and-plate configuration with a 25 mm-diameter 2° cone and a gap of 0.105 mm can be used for the measurements. Thermogravimetric analysis (TGA) can be used to study thermal degradation, using platinum pans in a $N_2$ atmosphere with a continuous 10 ml/min flow. The temperature range can be 40° C.-600° C. for the composite, with a heating rate of 10° C./min.

Figure 6:
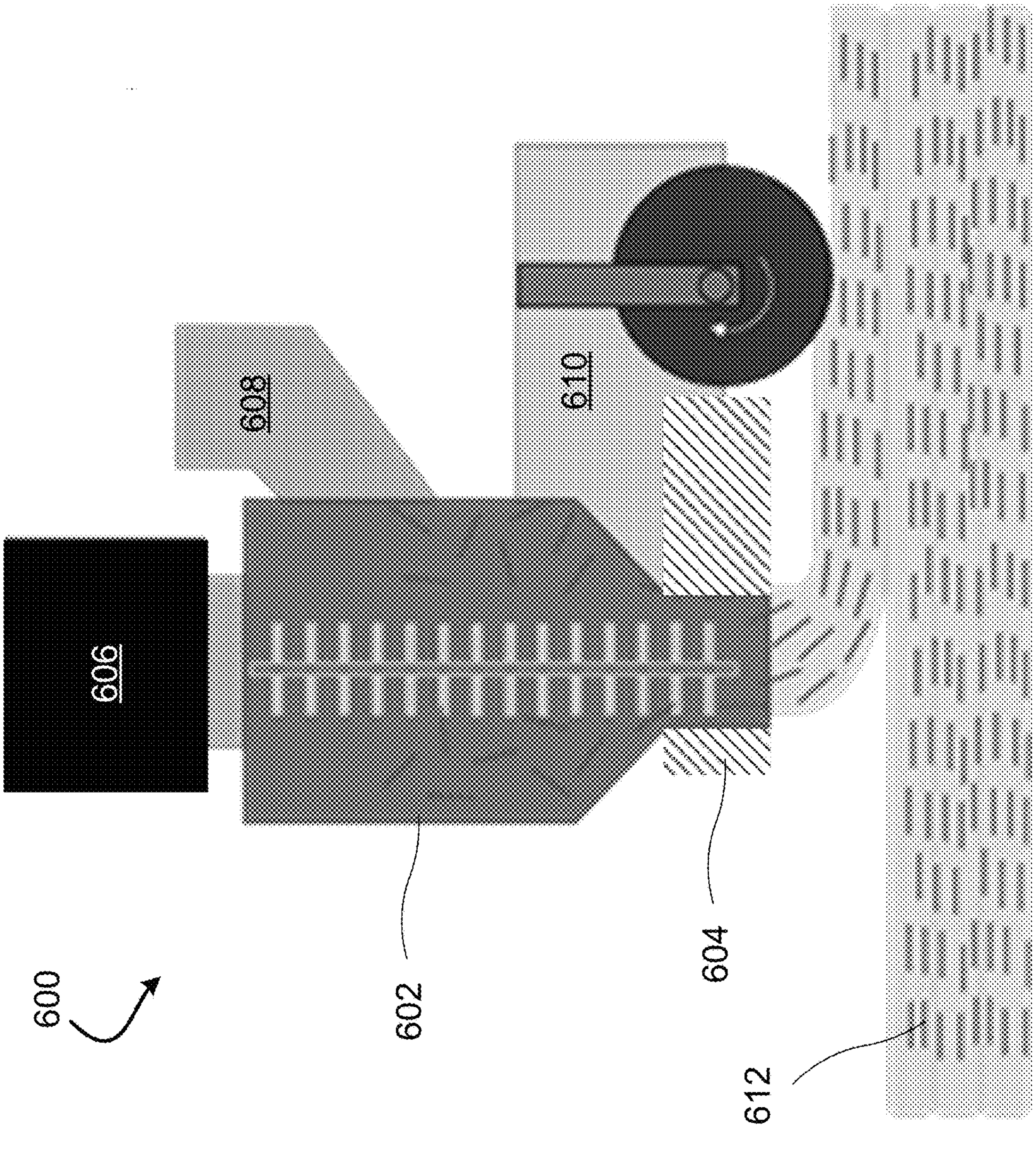
FIG. 6 is a schematic diagram showing a pressurized additive manufacturing (3D) printer head that enables the printing of high viscous mixtures of composite materials.

3D printing process optimization. As illustrated in FIG. 6, an additive manufacturing printer head 600 has been built which includes high-pressure extruder 602, heater 604, motor 606, feedstock hopper 608, and compactor 610. The high-pressure extruder 602 is used to print high-loading composite feedstock into printed layered structures 612. A customized heater 604 is used to locally melt the as-deposited materials, followed by a consolidation process by compactor 610 to establish a good interface between layers of printed layered structures 612. An online monitoring system includes a camera (e.g., an infrared camera, an optical camera, or both) that can be used to detect construction defects. Microstructure criteria to be evaluated and optimized include polymer crystallinity, carbon particle and wood particle distribution, and voids distribution.

Flame resistance ASTM testing. Flame resistance of the composite can first be tested at the bench-scale on coupon samples or smaller. UL 94/ISO 9773 is a simple, qualitative test normally applied to plastic parts in devices and appliances but could be adapted for the wood-plastic composite. A vertically suspended, 5"× ½" bar sample is ignited from the bottom, and the burning must stop within 60 s with no dripping allowed (5VA/B classification). American Society for Testing and Materials (ASTM) 2863 limiting oxygen index (LOI) test measures the minimum oxygen concentration required to sustain combustion; a material is generally considered flammable if its LOI is <26%. TGA of the wood-plastic composites can be tested to determine primary thermal decomposition stages and efficacy of carbonaceous particles to increase the decomposition temperatures of composites. TGA can also be used to estimate LOI based on the weight percent of char residue (CR) remaining at 850° C. using an empirical equation:

$$LOI=17.5+0.4CR$$

The TGA, LOI, and UL 94 tests can be used for rapid, in-house screening of material candidates. After narrowing the candidate pool, larger elements can be made and tested for flame resistance. ASTM E1354 measures heat and visible smoke release rates for materials and products using an oxygen consumption calorimeter (cone calorimeter). ASTM E84 is a standard test method for assessing the surface burning characteristics of building products. It measures the speed of flame spreading along a sample surface (flame spread index, FSI) and the amount of smoke emitted as the sample burns (smoke developed index, SDI).

Structural integrity ASTM testing. The composite's flow characteristics and rheological properties can be designed specifically to be 3D printed. Tensile properties of composites can be evaluated using an Instron Universal Test Machine 5569 according to ASTM D638. The crosshead speed can be 0.05 mm/min for measuring tensile modulus and 5 mm/min for tensile strength. Other physical properties of wood-plastic composites can be measured at the bench-scale according to the standards of ASTM D1037. Density and specific moisture content of wood-plastic composite samples can be measured with an oven dry method, where a coupon sample is weighed before and after drying at 103±2° C. for 24 hours. To calculate water absorption (WA) and thickness swelling (TS), wood-plastic composite samples can be immersed in water for 24 hours at room temperature, 50° C., and 75° C. To establish the mechanical properties of the wood-plastic composites, such as modulus of elasticity (MOE) and modulus of rupture (MOR), rectangular samples are cut and measured by the three-point bending test with a universal testing machine.

The mechanical properties of larger wood-plastic composite structures can also be tested according to the standards of ASTM D4761 to assess aspects of their load-bearing capacity. These tests are conducted on a rectangular board and include edgewise bending, flatwise bending, and axial strength in tension and compression. Loads are applied at rates to produce failure in approximately 1 min, and properties such as maximum load, deflection, modulus, and characteristics of failure are recorded.

Repurposing of 3D printed composites. The printed composite boards can be upcycled at the end of their useful lifetime using conventional mechanical recycling strategies. Because of the chemical adhesion strategies used to compatibilize the plastic and wood phases in the above boards, true recycling or reversion to starting materials will be difficult. Therefore, the boards can be ground into flakes using a Filabot Reclaimer, mixed with adhesives (e.g., PVA or epoxy-based chemistries), and pressed into new composite boards. The flake size and ratio of flake to adhesive can be varied to tune the mechanical properties. The energy consumption and carbon footprint of the downcycling process can be estimated to identify improvements.

Life cycle analysis (LCA) and techno-economic analysis (TEA). Cradle-to-gate and cradle-to-grave LCA and carbon negativity of the proposed carbon negative wood-plastic composite building materials will be performed. The impacts of these materials throughout a whole building will be analyzed, especially considering the lighter weight of the proposed structural materials over incumbents. An LCA model and framework for wood-plastic composite materials can be developed that captures the key energy and carbon requirements based on the composition and processing. Analogs can be identified that are expected to have a similar carbon footprint on a mass basis to create a well-defined baseline that will be validated against the literature. These analogs include manufactured materials such as OSB and commercially available wood-plastic composites (e.g., Trex®). Steel I-beams/H-beams set the conventional incumbent baseline. Given the high carbon intensity of steel and concrete, the comparison suggests a substantial improvement on a mass basis. The best-in-class incumbent CLT is biomass derived so that improvements over this baseline may require a deeper investigation into the impacts of the longer growth cycles of CLT, how the residual waste from CLT is disposed of (it might rot and produce $CH_4$ and additional $CO_2$ emissions), and durability and resistance to rot compared to wood-plastic composites and structurally equivalent forms (e.g., I-beams, honeycombs) with much less mass.

CLT cropping cycles can be as long as 30-50 years, whereas the disclosed wood-plastic composite may be able to source biomass from fast growing bamboo and corn stover or saw dust including wastes from CLT production. The length of the cropping cycle is important as the persistence of $CO_2$ in the atmosphere can be thousands of years. As the time-based release of $CO_2$ is critical for understanding the impact of each technology, the cumulative radiative forcing potential from the $CO_2$ emissions can be assessed. This will allow the capture of the warming effects of anthropogenic and biogenic $CO_2$ and the tradeoff across incumbent technologies, accounting for time-based differences in warming potential. The preliminary LCA can be updated based on final material performance and processes and be used to identify the optimal ratio of wood, plastic, and carbon in the material and whole building. This final LCA can include other sustainability and environmental impacts beyond $CO_2$ emissions. For example, most CTLs and wood-plastic composites rely heavily on strong fossil-derived adhesives that often produce harmful volatile organic compounds (VOCs). The approach of using synthetic graphitic carbon, with functionalized groups providing the adhesion, avoids these VOCs. The LCA can be developed with the state-of-the-art OpenLCA software package using supply chain inputs from Ecoinvent and the US Life Cycle Inventory, with appropriate steps taken to model the particular conditions of wood-plastic composites and incumbents in the US.

Techno-Economic Model. A model can be created using the appropriate analysis tools (e.g., Excel, AspenOne) which estimate the Capital Expenses, Operating Expenses, and Potential Revenues for an n-th plant installation of all necessary unit processes (e.g., polymer sort/shred, WBC product mix, 3D printing shop). The process design can estimate capital equipment sizes and counts required for major equipment, labor estimates, energy requirements, consumables, and assign appropriate overheads. The appropriate installation factors can be applied to equipment purchase estimates taken from vendor quotes or "off-the-shelf" pricing databases.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of fabricating a wood-plastic composite, the method comprising:

capturing carbon dioxide from air, wherein capturing carbon dioxide from air comprises direct air capture;

providing the carbon dioxide to algae;

harvesting the algae;

liquefying the algae to yield biochar;

treating the biochar to yield functionalized carbon, wherein treating the biochar comprises exfoliating the biochar under ultrasonic cavitation, and the functionalized carbon comprises one or more of hydroxyl groups, alkyl groups, amino groups, carboxylates, oxidized nitrogen, aldehydes, ketones, pyrrolic nitrogen, epoxies, pyridines, graphitic nitrogen, ethers, maleic anhydride-grafted polypropylene, maleic anhydride-grafted polyethylene, or aminosilane crosslinkers; and combining the functionalized carbon, wood flour, and a plastic feedstock to yield the wood-plastic composite.

2. The method of claim 1, wherein the algae comprise one or more of Kirchneriella sp., *Nannochloropsis* gaditana, and *Chlorella* sp.

3. The method of claim 1, wherein liquefying the algae comprises hydrothermal liquefaction.

4. The method of claim 3, wherein the hydrothermal liquefaction is carried out in a temperature range of about 150° C. to about 350° C. and at a pressure less than or equal to about 20 MPa.

5. The method of claim 1, wherein the plastic feedstock comprises high density polyethylene terephthalate, low density polyethylene terephthalate, or both.

6. The method of claim 1, further comprising providing the wood-plastic composite to an additive manufacturing apparatus.

7. The method of claim 6, further comprising fabricating, with the additive manufacturing apparatus, a structural component comprising the wood-plastic composite.

8. The method of claim 7, wherein the structural component comprises a board.

* * * * *